(12) United States Patent
Oggier

(10) Patent No.: US 8,964,028 B2
(45) Date of Patent: Feb. 24, 2015

(54) STRAY LIGHT COMPENSATION METHOD AND SYSTEM FOR TIME OF FLIGHT CAMERA SYSTEMS

(75) Inventor: Thierry Oggier, Zurich (CH)

(73) Assignee: MESA Imaging AG, Zurich (CH)

( * ) Notice: Subject to any disclaimer, the term of this patent is extended or adjusted under 35 U.S.C. 154(b) by 1082 days.

(21) Appl. No.: 12/987,404

(22) Filed: Jan. 10, 2011

(65) Prior Publication Data

US 2011/0149071 A1 Jun. 23, 2011

Related U.S. Application Data

(63) Continuation-in-part of application No. 12/974,871, filed on Dec. 21, 2010.

(60) Provisional application No. 61/288,672, filed on Dec. 21, 2009, provisional application No. 61/325,839, filed on Apr. 20, 2010.

(51) Int. Cl.
*H04N 7/18* (2006.01)
*G01S 17/89* (2006.01)
*G01S 7/497* (2006.01)
*G01S 17/36* (2006.01)

(52) U.S. Cl.
CPC ............ *G01S 17/89* (2013.01); *G01S 7/497* (2013.01); *G01S 17/36* (2013.01)
USPC ....................................... 348/140

(58) Field of Classification Search
CPC .......... G01S 17/36; G01S 17/89; G01S 7/497
USPC .............................................. 348/140, E7.085
See application file for complete search history.

(56) References Cited

U.S. PATENT DOCUMENTS

| | | | | |
|---|---|---|---|---|
| 5,870,180 | A * | 2/1999 | Wangler | 356/4.01 |
| 7,405,812 | B1 * | 7/2008 | Bamji | 356/5.1 |
| 8,052,305 | B2 * | 11/2011 | Hsiao | 362/253 |
| 8,400,511 | B2 * | 3/2013 | Wood et al. | 348/164 |
| 2005/0162638 | A1 * | 7/2005 | Suzuki et al. | 356/4.04 |
| 2006/0176469 | A1 * | 8/2006 | O'Connor et al. | 356/5.11 |
| 2008/0036996 | A1 * | 2/2008 | O'Connor et al. | 356/5.01 |
| 2011/0205340 | A1 * | 8/2011 | Garcia et al. | 348/46 |
| 2012/0008128 | A1 * | 1/2012 | Bamji | 356/5.01 |
| 2012/0013887 | A1 * | 1/2012 | Xu et al. | 356/4.02 |

FOREIGN PATENT DOCUMENTS

| | | |
|---|---|---|
| DE | 10 2007 011 417 A1 | 9/2008 |
| WO | 2009/077378 A1 | 6/2009 |
| WO | 2009/126022 A1 | 10/2009 |

OTHER PUBLICATIONS

Buettgen, B. et al., "CCD/CMOS Lock-In Pixel for Range Imaging: Challenges, Limitations and State-of-the-Art," Proceedings of the 1st Range Imaging Research Day at ETH Zurich, Switzerland, 2005, 12 pages.

(Continued)

*Primary Examiner* — Nhon Diep
(74) *Attorney, Agent, or Firm* — Fish & Richardson P.C.

(57) ABSTRACT

A method and system to compensate for stray light errors in time of flight (TOF) camera systems uses reference targets in the in the field of view (FOV) that can be used to measure stray light. In different embodiments, one or more reference targets are used.

10 Claims, 6 Drawing Sheets

(56) References Cited

OTHER PUBLICATIONS

Kahlmann, T. et al., "Calibration and development for increased accuracy of 3D range imaging cameras," Journal of Applied Geodesy, vol. 2, Gruyter, 2008, pp. 1-11.

Kavli, T. et al., "Modelling and Compensating Measurement Errors Caused by Scattering in Time-of-Flight Cameras," Proceedings of SPIE, vol. 7066, 2008, 10 pages.

Mure-Dubois, J. et al., "Real-time scattering compensation for time-of-flight camera," Proceedings of the 5th International Conference on Computer Vision Systems, Applied Computer Science Group, Bielefeld University, Germany, 2007, 10 pages.

International Search Report mailed May 11, 2011, from counterpart International Application No. PCT/US2010/061570, filed on Dec. 21, 2010.

International Preliminary Report on Patentability, mailed Jul. 5, 2012, from counterpart International Patent Application PCT/US2010/061570, filed Dec. 21, 2010.

* cited by examiner

STRAY LIGHT COMPENSATION METHOD AND SYSTEM FOR TIME OF FLIGHT CAMERA SYSTEMS

RELATED APPLICATIONS

This application is a Continuation-in-Part of U.S. application Ser. No. 12/974,871, filed on Dec. 21, 2010, which claims the benefit under 35 USC 119(e) of U.S. Provisional Application Nos. 61/288,672, filed on Dec. 21, 2009 and 61/325,839, filed on Apr. 20, 2010, all of which are incorporated herein by reference in their entirety.

BACKGROUND OF THE INVENTION

Three dimensional (3D) time-of-flight (TOF) cameras are active-type systems. In general, systems are based on the homodyne phase-measurement technique of emitted intensity-modulated light, which is reflected by the scene. The reflected light is imaged onto a sensor. The photo-generated electrons are demodulated in the sensor synchronously with the emitted-modulated light, and based on the phase information, the distance between the camera and the scene for each pixel is deduced.

A major problem of a TOF system is that the sensor has to handle high dynamic ranges. The modulated signal received by the camera drops with the square of the distance. Furthermore, the reflectivity of the targets might vary to a large degree. Both of these factors contribute to the high dynamic range.

As an example, the image might contain a bright object at 30 centimeters (cm) with a reflectivity of 100% and a dark object at 300 cm with a reflectivity of 10%. Therefore, the dynamic range to cover becomes:

$$DR = \frac{300^2 * 100}{30^2 * 10} = 1'000$$

The challenge of the high dynamic range in TOF imaging has been described by B. Buettgen in "CCD/CMOS lock-in pixel for range imaging: Challenges, limitations and State-of-the-art", Proceedings of the 1st Range Imaging Research Day at ETH Zurich, 2005.

Due to this high dynamic range requirement, stray light originating from the strong signal adding to the weak signal is a dominant problem for numerous applications of the TOF technology. A solution has been proposed by James Mure-Dubois et al. in "Real-time scattering compensation for time-of-flight camera", Proceedings of the 5th International Conference on Computer Vision Systems (ICVS 2007). A similar approach has been presented by T. Kavli et al. in "Modelling and Compensating Measurement Errors Caused by Scattering in Time-Of-Flight Cameras", Proceedings of SPIE, Vol. 7066, 2008.

However, in both aforementioned approaches the required computing power required makes it less feasible to embed the solution in high speed acquisition applications.

SUMMARY OF THE INVENTION

A first solution to compensate for stray light is proposed that uses reference targets with at least two differently reflectivities. The reference targets are at known distances/ranges or at least the difference in the ranges of the two targets is known. The different reflective areas show different phase drifts depending on the stray light in the image. The change in phase that is due to the amplitude of the reflective target allows for the estimation of the stray light in the image.

Knowing the stray light makes it possible to compensate for it on all pixels of interest.

These reference targets are used to measure stray light caused by high reflective objects in and adjacent to the scene.

The reference target might have more than one reflectivity and the evaluation of the stray light can be based on the change in the measured range of the two differently reflective targets.

Another approach is to use a single reference target. The change of phase/amplitude measurement over time allows for the estimation or determination of the stray light. The reference target in this case is preferably highly absorbing, i.e. low reflectivity. Using a combination of a high and low reflective reference targets enables the measurement of the stray light impact on the high absorbing target, while having a distance reference on the highly reflective target. This information is then used to estimate stray light among the other pixels and importantly compensate the range measurements of an object of interest in the scene.

In general, according to one aspect, the invention features a time of flight camera system comprising a time of flight camera including a controller for determining ranges of objects and a reference target system. The controller determines a range to an object of interest based on the measurement of the object of interest and the measurement of the reference target.

In certain embodiments, the reference target system is at a known range and preferably has a target with a low reflectivity. In one implementation, the reflectance is less than 20% or even less than 10%.

In certain embodiments, the reference target system further includes a high reflectivity target that has a reflectance of greater than 50% or greater than 60%.

Preferably, the controller monitors changes in a range of the reference target system due to stray light and corrects for the range of the object of interest.

In one application, the system is applied to a cow milking system that includes the time of flight camera system. A robot arm comprises a cup for attaching to a cow teat and the reference target system.

In general, according to another aspect, the invention features a method of stray light correction in a time of flight camera system. The method comprises determining a range of a reference target system with the time of flight camera system, comparing the determined range of the reference target system to a known range of the reference target system to determine a stray light correction, determining a range of an object of interest with the time of flight camera system, and correcting a range of the object of interest based on the stray light correction.

In one application, the object of interest is a cow teat and the method further comprises attaching a cup to the cow teat based on the corrected range of the cow teat.

The above and other features of the invention, including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
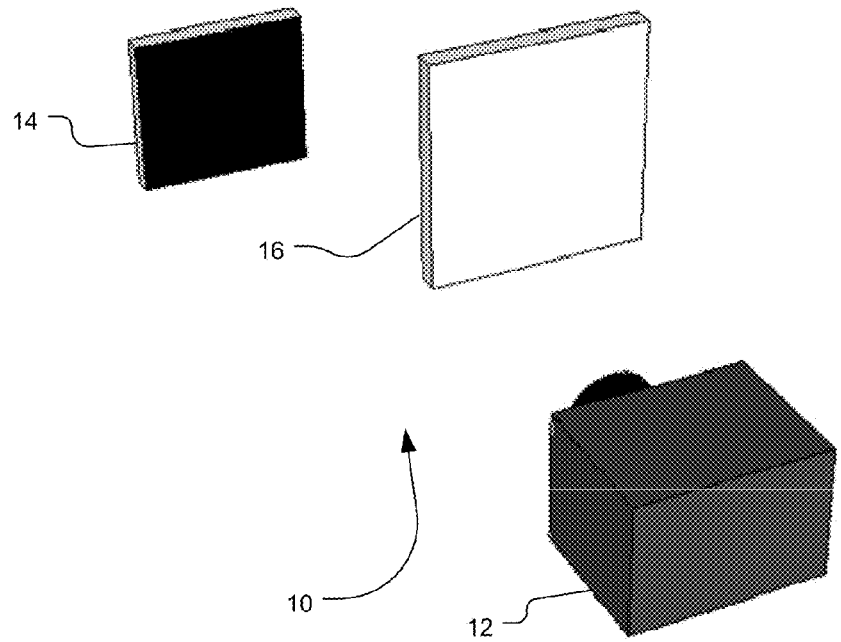
FIG. 1 is a schematic perspective view illustrating the source of the dynamic range requirements in time of flight (TOF) imaging systems.

FIG. 1 illustrates why there are high requirements on dynamic range and how a strong stray light signal adding to the weak signal is a dominant problem in many applications.

A time of flight (TOF) camera 12 images a scene 10 that includes a highly reflective element 16 at close range to the camera 12 and a low reflective element 14 at a larger distance from the camera 12. One problem that arises is that the highly reflective element 16 can create stray light that impacts the distance or range measurement for the low reflective element 14.

One mechanism by which the stray light impacts the range measurements is by the non-ideal optical paths in the camera 12.

Figure 2:
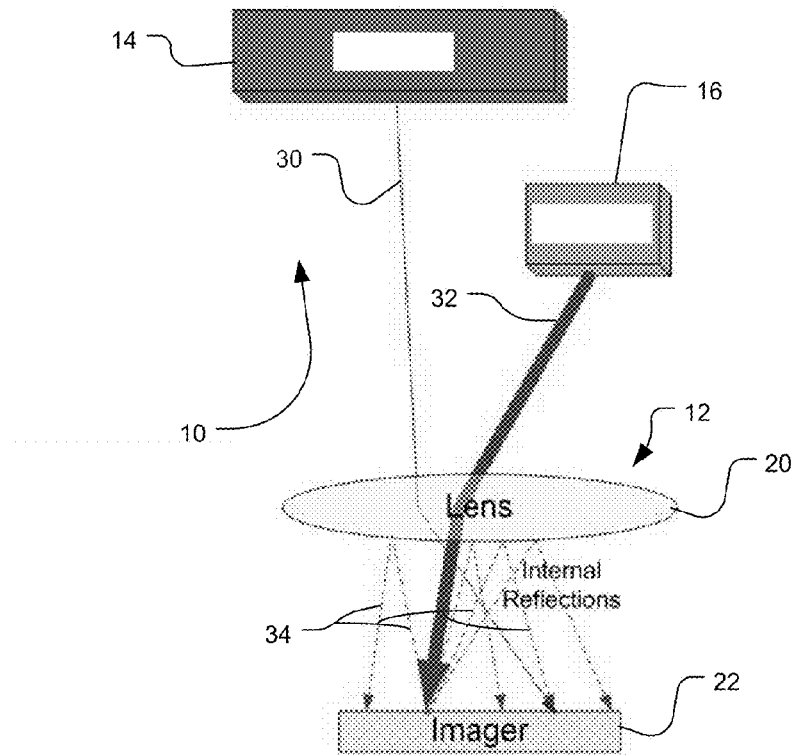
FIG. 2 is a schematic view showing stray light generated within the camera.

FIG. 2 shows one non-ideal path in the camera 12. The objective lens 20 images light from the scene 10 onto the imager chip 22 of the camera 12. This light includes the direct light 32 from the reflective close element 16 and direct light 30 from the distant element 14. Internal reflections 34 between a lens (objective) 20 and the imager chip 22 within the camera constitute stray light that is generated by the strong signal from element 16. However, stray light 34 might also been generated by multiple lenses inside the camera 12 or by an optical filter added in the optical path.

Figure 3A:
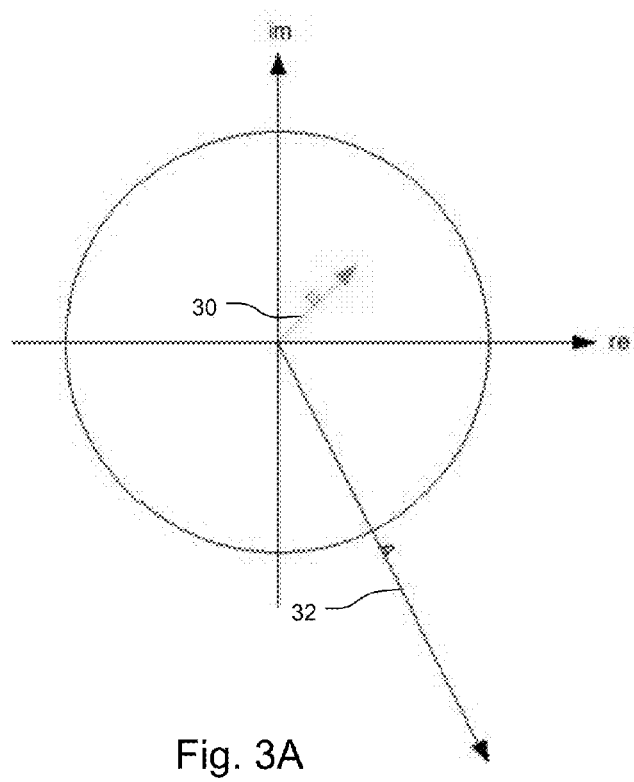
FIGS. 3A and 3B show the amplitude and phase measurements in the vector space for the ideal scenario and a scenario with stray light.
Figure 3B:
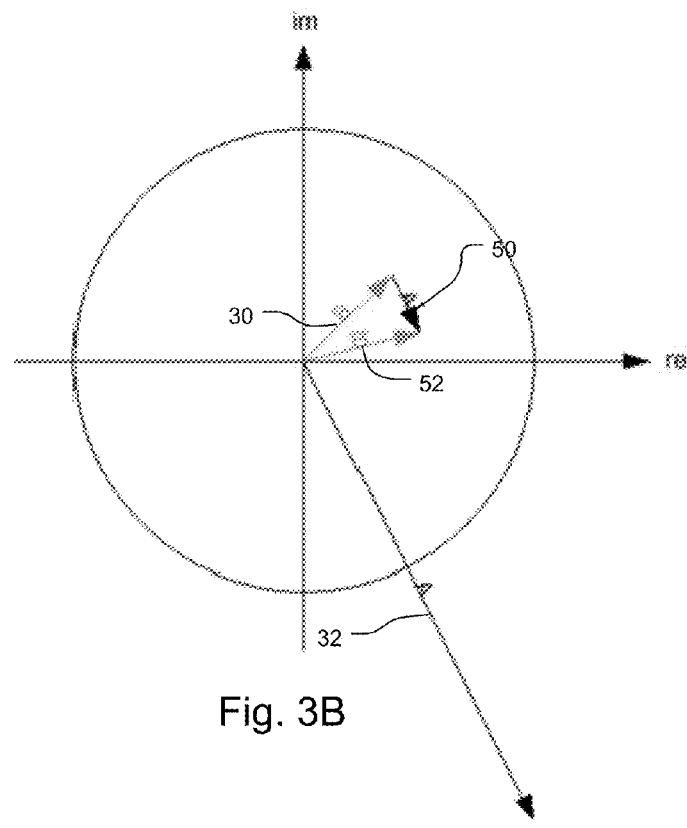

The impact of stray light for the case of a phase-measuring 3D TOF system is illustrated in FIGS. 3A and 3B.

FIG. 3A shows an ideal system without stray light. The range vectors for signal A 32 from target 1 16 on pixel A is not impacted by signal B 30 from target 2 14 on pixel B.

However, signal A 32 from highly reflective element 16 on pixel A is a strong signal, with a large amplitude. In contrast, signal B 30 from low reflective element 14 on pixel B is a weak signal, with a small amplitude.

FIG. 3B shows an actual system with stray light. Signal A' 50 is due to stray light from highly reflective element 16 that falls on pixel B. Signal B' 52 is the resulting (measured) signal on pixel B.

Figure 4:
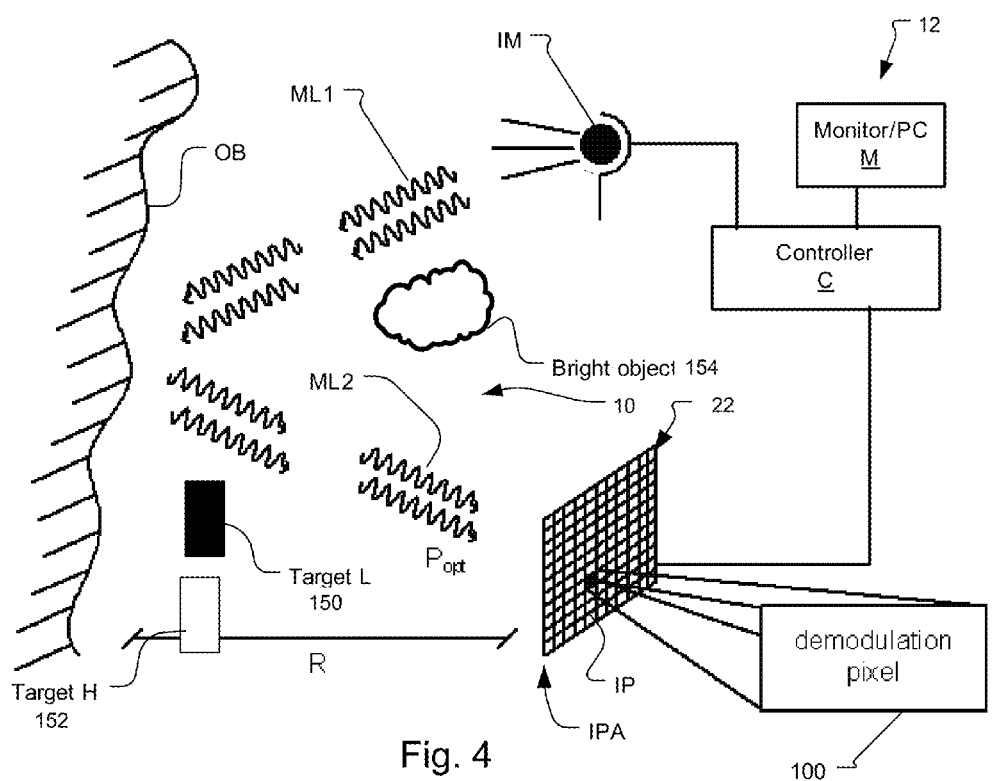
FIG. 4 is a schematic diagram illustrating a 3D-measurement camera system.

FIG. 4 illustrates the basic principle of a 3D-measurement camera system based on a camera 12 comprising the demodulation pixels 100.

Modulated illumination light ML 1 from an illumination module or light source IM of the camera 12 is sent to the object OB of a scene. A fraction of the total optical power sent out is reflected back to the camera 12 and detected by the 3D imaging sensor 22 of the camera 12. The sensor 22 comprises a two dimensional pixel matrix IP of the demodulation pixels 100. Each pixel 100 is capable of demodulating the impinging light signal ML2.

A controller C regulates the timing of the camera 12. The phase values of all pixels correspond to the particular distance information of the corresponding point in the scene. The two-dimensional gray scale image with the distance information is converted into a three-dimensional image by controller C. This can be displayed to a user via display D or used as a machine vision input.

The distance R for each pixel is calculated by $$R=(c*\text{TOF})/2,$$

with c as light velocity and TOF corresponding to the time-of-flight. Continuously intensity-modulated light ML1 is sent out by the illumination module or light source IM, reflected by the object OB and detected by the sensor 22. With each pixel 100 of the sensor 22 being capable of demodulating the optical signal at the same time, the controller C is able to deliver 3D images in real-time, i.e., frame rates of up to 30 Hertz (Hz), or even more, are possible. Continuous sine modulation delivers the phase delay (P) between the emitted signal and the received signal, also corresponding directly to the distance R:

$$R=(P*c)/(4*\text{pi}*f\text{mod}),$$

where fmod is the modulation frequency of the optical signal ML1. Typical state-of-the-art modulation frequencies range from a few MHz up to a few hundreds of MHz or even GHz.

The controller C resolves the range for each pixel 100 from the calculated phase delay to determine the distance to the object of interest OB. According to an embodiment, the controller C further compensates this range based on noise from stray light produced by bright object 154. This is accomplished by determining the amount of stray light and/or the range error produced by the stray light by reference to the range information that is determined by the controller C for a highly reflecting target 152 and/or a low reflective target 150. In one embodiment, the range to the highly reflecting target 152 and/or the low reflective target 150 is known or a difference in the range between the highly reflecting target 152 and the low reflective target 150 is known.

Figure 5A:
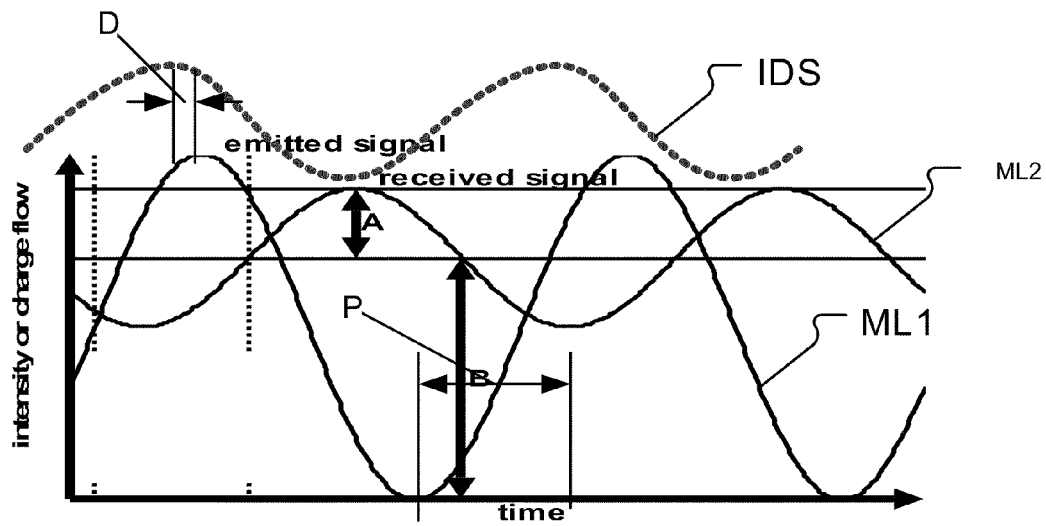
FIGS. 5A and 5B are plots of intensity as a function of time showing the relationship between signals for the case of continuous sinusoidal modulation and the signal sampling.
Figure 5B:
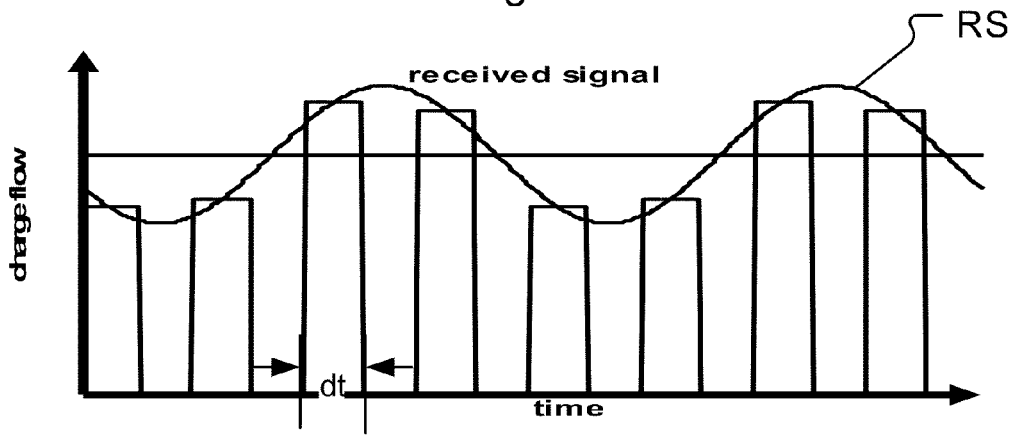

FIGS. 5A and 5B show the relationship between signals for the case of continuous sinusoidal modulation and the signal sampling.

FIG. 5A shows both the modulated emitted illumination signal ML1 and received signal ML2. The amplitude A, offset B of the received signal ML2 and phase P between both signals are unknown, but they can be unambiguously reconstructed with at least three samples of the received signal.

In FIG. 5B, a sampling with four samples per modulation period is depicted. Each sample is an integration of the electrical photo-signal in the pixels 100 over a duration dt that is a predefined fraction of the modulation period. Typically, in demodulation pixels with 4 integration sites dt corresponds to a quarter of the period. In order to increase the signal to noise ratio of each sample the photo-generated charges are usually accumulated over several—up to more than 1 million—modulation periods in the integration sites.

The controller C, employing for example a field programmable gate array (FPGA), generates the signals for the synchronous channel activation in the sensor chip 22.

Using these four samples, the three decisive modulation parameters amplitude A, offset B and phase shift P of the modulation signal are extracted by the equations $$A = \text{sqrt}[(A3-A1)^2 + (A2-A1)^2]/2$$

$$B = [A0+A1+A2+A3]/4$$

$$P = \arctan[(A3-A1)/(A0-A2)]$$

The first embodiment uses a reference target with two different reflectivities, target L 150, and target H 152.

Figure 6:
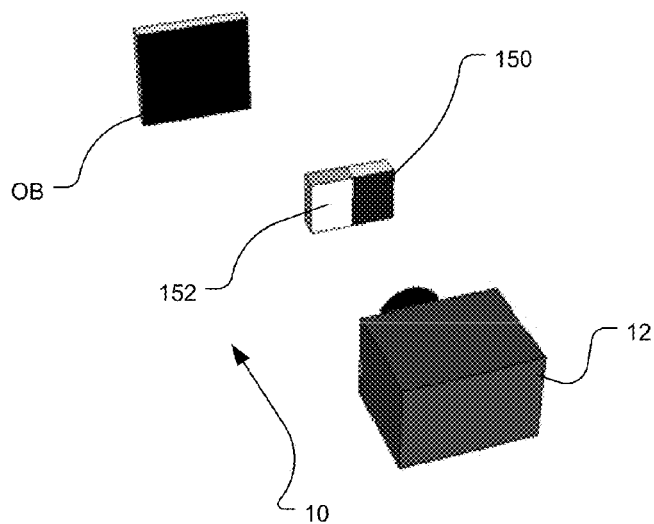
FIG. 6 is a schematic perspective view illustrating the use of a highly reflective target and a low reflective target.

FIG. 6 shows the setup using a reference target with two different reflectivities.

Assume reference target H 152 is a high-reflective target and reference target L 150 is a low-reflective target. If there is no or only negligible stray light, the phase measured for H and L should be the same when they are at the same range in one setup.

On the other hand, if there is a very bright object 154 in the scene 10 or adjacent to the scene causing non-negligible stray light effects, the phase impact on low reflective reference target L 150 is bigger than the impact on the high reflective reference target H 152. Of course, this assumes that the object 154 causing stray light is not at a distance corresponding to a phase value=phasereference+n*pi, with n being 0, ±1, ±2, . . . .

The impact of the very bright object 154 is determined for the reference targets 150 and 152 by the controller C. This information is used to correct the distance or range measurement for the object of interest OB in the scene 10.

Figures 7A, 7B:
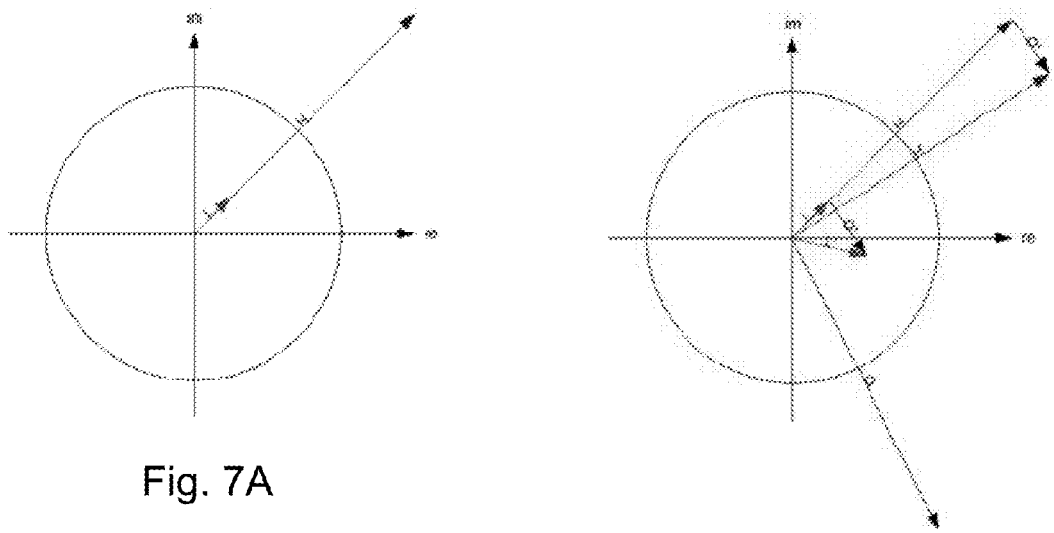
FIGS. 7A and 7B show the amplitude and phase measurements in the vector space for the ideal scenario and a scenario with stray light for a high and low reflective target.

FIG. 7A shows the amplitude and phase measurements in the vector space with two ideal reference targets H and L without any impact by stray light.

FIG. 7B shows the amplitude and phase measurements illustrated in the vector space when the ideal vectors H and L of a high a high and low reflective target. Also shown is their actual measurements H' and L' with stray light impact O' by another bright object O at a different distance (phase) in the scene.

L=ideal measurement of the low-reflective reference target;
H=ideal measurement of the high-reflective reference target;
O=measurement of the object causing stray light effects;
L'=real measurement of the low-reflective reference object including stray light;
H'=real measurement of the high-reflective reference object including stray light; and
O'=stray light impact caused by object O 154.

Assuming the stray light is similar to the targets H and L 152, 150, the impact on the phase measurement due to stray light is much bigger on L than it is on H. This assumption represents well the reality if the reference target H and L are positioned nearby.

The theoretical vector functions looks as follows:

$$\vec{H}_{ideal} = \begin{pmatrix} xh_{ideal} \\ yh_{ideal} \end{pmatrix}$$
$$= \begin{pmatrix} xh_{measured} \\ yh_{measured} \end{pmatrix} - \begin{pmatrix} x_{stray} \\ y_{stray} \end{pmatrix}$$

$$\vec{L}_{ideal} = \begin{pmatrix} xl_{ideal} \\ yl_{ideal} \end{pmatrix}$$
$$= \begin{pmatrix} xl_{measured} \\ yl_{measured} \end{pmatrix} - \begin{pmatrix} x_{stray} \\ y_{stray} \end{pmatrix}$$

Furthermore, we know that:

$$\varphi_{H\ ideal} = \text{atan}\left(\frac{yh_{ideal}}{xh_{ideal}}\right)$$
$$= \varphi_{L\ ideal}$$
$$= \text{atan}\left(\frac{yl_{ideal}}{xl_{ideal}}\right)$$

$$\frac{yh_{ideal}}{xh_{ideal}} = \frac{yl_{ideal}}{xl_{ideal}}$$

If furthermore the ratio of the real amplitudes of the high reflective object to the low reflective object is known (=F), then:

$$\vec{H}_{ideal} = \begin{pmatrix} xh_{ideal} \\ yh_{ideal} \end{pmatrix}$$
$$= \begin{pmatrix} xh_{measured} \\ yh_{measured} \end{pmatrix} - \begin{pmatrix} x_{stray} \\ y_{stray} \end{pmatrix}$$
$$= F * \begin{pmatrix} xl_{ideal} \\ yl_{ideal} \end{pmatrix}$$
$$= F * \begin{pmatrix} xl_{measured} \\ yl_{measured} \end{pmatrix} - F * \begin{pmatrix} x_{stray} \\ y_{stray} \end{pmatrix}$$

$$\begin{pmatrix} xh_{measured} \\ yh_{measured} \end{pmatrix} - F * \begin{pmatrix} xl_{measured} \\ yl_{measured} \end{pmatrix} = \begin{pmatrix} x_{stray} \\ y_{stray} \end{pmatrix} - F * \begin{pmatrix} x_{stray} \\ y_{stray} \end{pmatrix}$$

$$\begin{pmatrix} x_{stray} \\ y_{stray} \end{pmatrix} = \frac{1}{1-F} * \begin{pmatrix} xh_{measured} \\ yh_{measured} \end{pmatrix} - \frac{F}{1-F} * \begin{pmatrix} xl_{measured} \\ yl_{measured} \end{pmatrix}$$

If we assume now, that pixels for evaluation, i.e., the pixels for the object of interest OB, have the same stray light as the reference pixels associated with target L and target H, the stray light vector is compensated by the controller C.

If the real amplitude ratio of the two reference targets are not known, one can assume in a first order approximation that:

$$F = \frac{Amplitude_{real}H}{Amplitude_{real}L} \approx \frac{Amplitude_{measured}H}{Amplitude_{measured}L}$$

Furthermore, based on the first know-how of the stray light on the reference pixels, more sophisticated stray light models and its compensation depending on the pixel position and location of the stray light origin can be developed.

In order to detect stray light, one can also observe the distance change of a stable target over time. If the target's position or range to the camera is not changed, but all of the sudden the measured distance is changing, the controller C assumes that there has been an object introduced to the scene that causes stray light and therefore, impacts the reference distance. Based on the distance change of the reference target, the stray light is estimated by the controller C.

Figure 8:
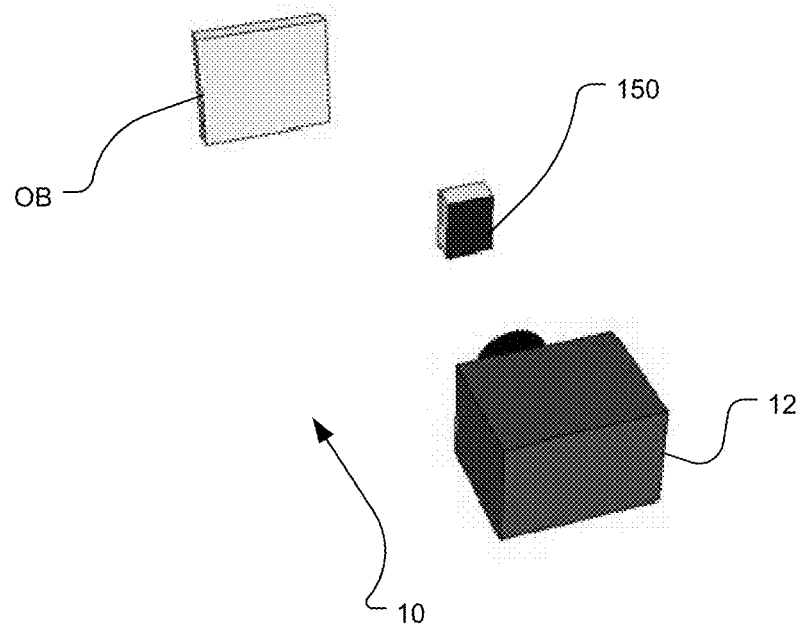
FIG. 8 is a schematic perspective view illustrating the use of a low reflective target.

FIG. 8 shows the determination of stray light using the measurement change of the fixed reference object, in this case with only a low reflective target 150.

In case where the reference target is highly reflective, the measurement of the reference target might also be used as reference for relative distance measurement.

However, if the stray light component on the target has to be estimated, it is preferred to use a low-reflective target 150. In the theoretical case of a 0% reflectivity, the increase in amplitude and the resulting phase of the pixels imaging the reference object directly give the amount of stray light impinging on the pixel.

Again, based on the location of the reference target 150 and with possible know-how of the position or range of the object that generates the stray light, the impact on all other pixels can be estimated. The object's position can be either a priori given certain setups to be measured or can be detect by evaluating the intensities of all other pixels in the pixel field.

In one implementation, the controller C uses a) a high reflective reference target to get a distance reference or to do relative phase measurement, and b) a low reflective reference target to get direct information of the stray light. In this case, multi-colored reference targets (having at least two reflectivities) are preferably used and information, reference distance and stray light impact, are measured simultaneously.

Figure 9:
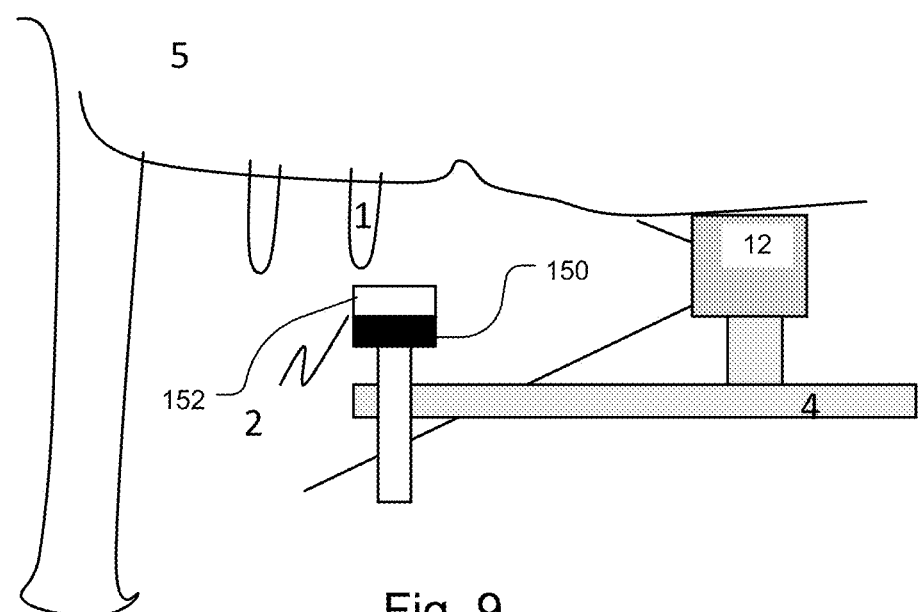
FIG. 9 is a schematic view showing the use of the targets in a cow milking application that uses a TOF camera to control cup-teat attachment.

FIG. 9 illustrates one implementation. The system and method are used in the teat detection and measurement process in the automatic cow milking industry.

A robot arm 4 holds the camera 12 and the cup 2. Based on the camera measurements, the robot arm 4 guides the cup 2 and attaches it to the appropriate teat 1. In this sample application, relative measurement between the cup 2 and the corresponding teat might be sufficient and absolute depth values not needed. However, stray light might cause not only the absolute measurement to fail, but also the relative one. The cup 2 is used as reference for the relative measurement is preferably well-reflective in order to reduce the depth noise (increase signal to noise ratio). It thus includes a highly reflective portion or target 152. At the same time, the teat 1 to be detected might be highly absorbing. Having now a lot of stray light in the image, the measurement of the badly reflecting teat drifts in general more than the well-reflective cup. Hence, the absolute as well as the relative measurements (distance cup to teat) is impacted by stray light.

Applying now the present compensation method, the cup 2 includes in part a well-reflective material 152 (for the reference measurement) and in part a highly absorbing material or target 150. In this setup, it can be assumed that the real distance from the camera 12 to the cup 2 does not change because both are fixed on the robot arm 4. In case the distance measurement of the black part 152 of the cup 2 is now changing, the controller C assumes the presence of stray light that causes this apparent change. Dependent on the measurement change, the actual amount of stray light is estimated by the controller C and the measurement of the teat position as well as the reference cup position is corrected correspondingly by the controller C.

There are different possibilities to estimate/detect stray light. In all cases, we assume the reference object (in this case the cup) does not change its distance to the camera 12 during the measurement sequence. Having a bi-colored cup, the stray light is measured by evaluating the distance difference between the absorbing part compared to the reflective part. Another method to estimate stray light is for the controller C to monitor the distance measurement of the absorbing part only. For example, in a first position where it can be assumed that there is limited stray light in the scene, a reference measurement is acquired by the controller C. Future measurements relate this "no stray light reference" measurement and the vector component caused by stray light is then deduced by the controller C by a simple vector subtraction of the newly measured vector and the "no stray light reference" vector. The "no stray light reference" vector is preferably updated regularly in order to avoid misinterpretation of other possible drift effects like e.g. caused by temperature.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of stray light correction in a time of flight camera system, comprising:
    determining a range of a reference target system with the time of flight camera system;
    comparing the determined range of the reference target system to a known range of the reference target system to determine a stray light correction; and
    determining a range of an object of interest with the time of flight camera system; and
    correcting a range of the object of interest based on the stray light correction.

2. A method as claimed in claim 1, wherein the reference target has a low reflectivity.

3. A method as claimed in claim 1, wherein the reference target has a reflectance of less than 20%.

4. A method as claimed in claim 1, wherein the reference target has a reflectance of less than 10%.

5. A method as claimed in claim 1, further comprising estimating an amount of stray light for the object of interest.

6. A method as claimed in claim 1, wherein the reference target system includes a low reflectivity target and a high reflectivity target.

7. A method as claimed in claim 1, wherein the reference target system includes a low reflectivity target and a high reflectivity target having a reflectance of greater than 50%.

8. A method as claimed in claim 1, wherein the reference target system includes a low reflectivity target and a high reflectivity target having a reflectance of greater than 60%.

9. A method as claimed in claim 1, further comprising monitoring changes in a range of the reference target system due to stray light and correcting for the range of the object of interest.

10. A method as claimed in claim 1, wherein the object of interest is a cow teat and the method further comprises attaching a cup to the cow teat based on the corrected range of the cow teat.

* * * * *